US012362114B2

(12) United States Patent
Graskowski et al.

(10) Patent No.: US 12,362,114 B2
(45) Date of Patent: Jul. 15, 2025

(54) COMPACT VACUUM INTERRUPTER

(71) Applicant: Siemens Aktiengesellschaft, Munich (DE)

(72) Inventors: Frank Graskowski, Wandlitz (DE); Ulf Schümann, Dallgow-Döberitz (DE); Alexander Ziefle, Potsdam (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 18/029,256

(22) PCT Filed: Sep. 13, 2021

(86) PCT No.: PCT/EP2021/075066
§ 371 (c)(1),
(2) Date: Mar. 29, 2023

(87) PCT Pub. No.: WO2022/069199
PCT Pub. Date: Apr. 7, 2022

(65) Prior Publication Data
US 2023/0360871 A1 Nov. 9, 2023

(30) Foreign Application Priority Data
Sep. 30, 2020 (DE) ..................... 10 2020 212 377.2

(51) Int. Cl.

| | |
|---|---|
| ***H01H 33/664*** | (2006.01) |
| ***H01H 1/02*** | (2006.01) |
| ***H01H 1/04*** | (2006.01) |
| ***H01H 9/00*** | (2006.01) |

(52) U.S. Cl.
CPC ........ *H01H 33/664* (2013.01); *H01H 1/0203* (2013.01); *H01H 1/04* (2013.01); *H01H 9/0038* (2013.01)

(58) Field of Classification Search
CPC ............. H01H 33/664; H01H 33/6661; H01H 33/121; H01H 1/0203; H01H 1/04; H01H 9/0038
USPC ................. 218/118, 126, 123, 130, 132, 136
See application file for complete search history.

(56) References Cited

U.S. PATENT DOCUMENTS 3,379,846 A * 4/1968 Wood ........................ C22C 9/00 200/267
3,548,135 A 12/1970 Wood
5,168,139 A 12/1992 Bettge et al.
5,330,088 A * 7/1994 Whitlow .............. B23K 35/007 228/179.1

(Continued)

FOREIGN PATENT DOCUMENTS

CN 104966650 A 10/2015
DE 1640038 A1 9/1970

(Continued)

*Primary Examiner* — William A Bolton
(74) *Attorney, Agent, or Firm* — Laurence A. Greenberg; Werner H. Stemer; Ralph E. Locher

(57) ABSTRACT

A compact vacuum interrupter has an insulator element, a moving contact connection, a fixed contact connection, a moving contact, and a fixed contact. The moving contact has a moving contact rod and a moving-contact contact element. The fixed contact has a fixed contact rod and a fixed-contact contact element. The moving contact is formed with a material that is mechanically stronger than a material of the fixed contact.

14 Claims, 3 Drawing Sheets

(56) References Cited

U.S. PATENT DOCUMENTS

| | | | | | |
|---|---|---|---|---|---|
| 5,594,224 | A * | 1/1997 | Tanimizu | H01H 33/66 | 218/135 |
| 5,847,347 | A * | 12/1998 | Schwarze | H01H 33/662 | 218/139 |
| 6,046,422 | A * | 4/2000 | Renz | H01H 33/66207 | 218/139 |
| 6,753,494 | B2 * | 6/2004 | Asakawa | H01H 33/664 | 218/130 |
| 7,334,319 | B2 * | 2/2008 | Kusserow | H01H 33/666 | 218/123 |
| 7,820,934 | B2 * | 10/2010 | Cardoletti | H01H 33/66261 | 218/123 |
| 8,497,445 | B2 * | 7/2013 | Yoshida | H01H 33/66207 | 218/118 |
| 8,658,933 | B2 | 2/2014 | Gentsch | | |
| 8,869,393 | B2 * | 10/2014 | Gentsch | H01H 33/664 | 29/874 |
| 2006/0102594 | A1 * | 5/2006 | Kikuchi | H01H 1/0206 | 218/123 |
| 2015/0114931 | A1 * | 4/2015 | Gentsch | H01H 33/6642 | 218/127 |
| 2015/0200059 | A1 * | 7/2015 | Noda | H01H 1/06 | 218/132 |
| 2019/0172665 | A1 | 6/2019 | Newinger | | |

FOREIGN PATENT DOCUMENTS

| | | | |
|---|---|---|---|
| DE | 2124426 | A1 | 11/1972 |
| DE | 102007021091 | A1 | 11/2008 |
| DE | 102016213294 | A1 | 1/2018 |
| EP | 0435865 | A1 | 7/1991 |

* cited by examiner

COMPACT VACUUM INTERRUPTER

FIELD AND BACKGROUND OF THE INVENTION

The invention relates to a compact vacuum interrupter. Vacuum interrupters are used in low-, medium- and high-voltage switchgear.

To conduct currents, a vacuum interrupter requires what is referred to as a current path, which conducts the current to the contact system in the vacuum. This current path is usually divided into two regions, a stationary part-fixed-contact current path, that is to say a fixed contact- and a movable part-movable-contact current path, that is to say a movable contact. The current path components usually consist of the same material, for example copper. The homogeneous material selection is deviated from in particular for what are referred to as contact disks, which must have sufficient resistance to arc events. In the case of vacuum interrupters, interrupters in short, that can conduct rated currents, a copper material, in particular oxygen-free copper, is usually selected. In the case of interrupters in which the current only commutates into the interrupter to disconnect it, it is also possible to use, for example, stainless steel in the two current path components.

In the case of interrupters optimized in terms of material use, which do not conduct rated current but very frequently interrupt a current at least in a test situation, the thermal loading caused by the high input of arc energy is relatively high. In this application, the use of a current path of stainless steel can be advantageous from a mechanical perspective.

Since, however, in common switching situations thermal limits are quickly reached, a sufficiently solid design in copper is generally preferred.

As an alternative, the prior art, such as for example DE 102016213294 A1, has also disclosed stiffened contact rods, wherein the contact rods as electrical conductors comprise the same materials, but the one or more contact rods are stiffened with another material. However, such a combination is complex to produce and expensive.

SUMMARY OF THE INVENTION

It is now an object of the invention to overcome the disadvantages of the prior art and to provide a compact vacuum interrupter with reduced use of material.

The object is achieved by the claimed invention.

A first exemplary embodiment relates to a compact vacuum interrupter having an insulator element, a movable-contact connection, a fixed-contact connection, a movable contact, and a fixed contact, wherein the movable contact has a movable-contact rod and a movable-contact contact element, and wherein the fixed contact has a fixed-contact rod and a fixed-contact contact element, wherein the movable contact is made with a first material and the fixed contact is made with a second material, wherein the first material is mechanically stronger than the second material.

Here, a mechanically stronger material is understood to mean a material which is more resistant to mechanical stresses, for example is stiffer and/or harder, that is to say in particular is more resistant to deformations. The combination of a good electrical conductor and good heat conductor as first material on the fixed-contact side and a mechanically stronger material on the movable-contact side makes it possible to reduce the diameter of the vacuum interrupter, without adversely affecting the switching power. It is also possible for the drive for the movable contact to have a smaller, that is to say less efficient design, since the mass of the movable contact is reduced, or alternatively for it to be switched more quickly with the same energy.

In particular, it is preferred if what is involved is a compact vacuum interrupter for low-, medium- and/or high-voltage switches. It is also preferred if what is involved is a compact vacuum interrupter for low-, medium- and/or high-voltage tap changers. In this respect, the medium- and high-voltage applications are particularly preferred.

It is also preferred for the vacuum interrupter to be suitable for operation in a gas chamber with a gas pressure of more than 1 bar. In particular, it is preferred for the gas in the gas chamber to be formed from air constituents, in particular nitrogen and/or carbon dioxide, or contain a ketone or a fluoronitrile, sulfur hexafluoride, an olefin, polyfluoroolefin, or a hydrofluoroolefin.

It is further preferred for the vacuum interrupter to be configured to act as secondary current path in a switchgear, that is to say configured to switch switch-off currents.

It is preferred for the movable-contact rod to be made with a first material and the fixed-contact rod to be made with a second material, and the movable-contact contact element and the fixed-contact contact element to be made from a third material, wherein the first material is mechanically stronger than the second material and the third material is a material which is optimized in terms of properties under arc conditions.

It is also preferred for the second material to be copper or a copper alloy.

It is further preferred for the first material to be a chromium-nickel alloy or steel alloy, in particular stainless steel alloy.

It is also preferred for the third material to be a copper alloy made with tungsten and/or chromium and/or carbon.

It is also preferred for the movable-contact rod to have a diameter and for the movable-contact rod, in a first movable-contact rod region, to have a narrowing, wherein the narrowing reduces the diameter.

It is further preferred for the narrowing to reduce the diameter of the movable-contact rod by 5% to 25%.

It is also preferred for the narrowing to reduce the diameter of the movable-contact rod by 10% to 20%.

It is also preferred for the first movable-contact rod region with the narrowing to be arranged in the compact vacuum interrupter such that the first movable-contact rod region is arranged within the insulator element. Within the insulator element means that the insulator element surrounds, in particular annularly surrounds, the first movable-contact region.

It is further preferred for one, two or more shield elements to be arranged between the insulator element and the first movable-contact rod region. In this respect, the shield elements serve both as damping protection for the insulator and as field control.

A further exemplary embodiment relates to a switchgear having a compact vacuum interrupter according to one or more of the above statements relating to the first exemplary embodiment.

It is preferred if the compact vacuum interrupter is arranged in a secondary current path and is configured to switch off rated currents.

It is also preferred for one or more compact vacuum interrupters to be arranged in a tap changer, in particular arranged in a tap changer for transformers.

The invention will be explained by way of example below with reference to figures.

DETAILED DESCRIPTION OF THE INVENTION

Figure 1:
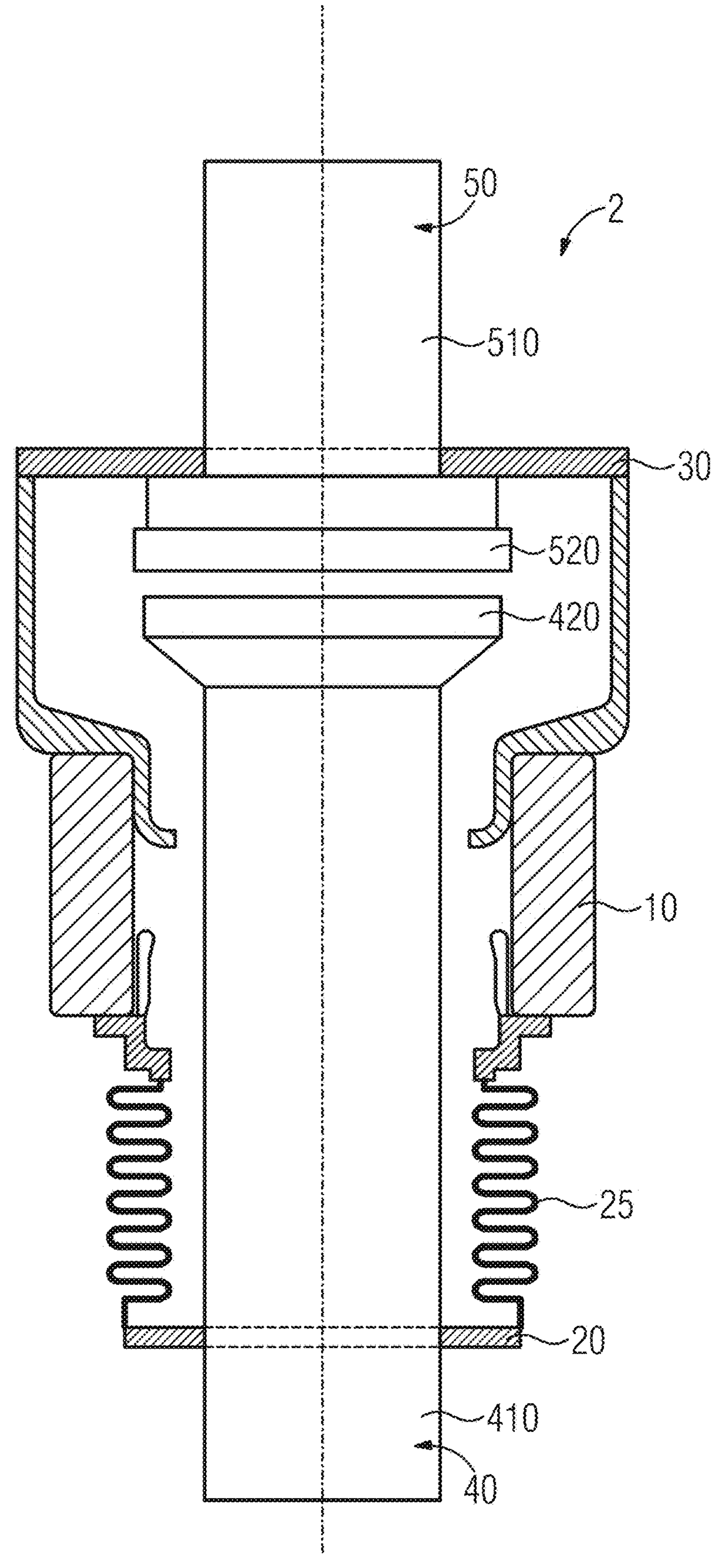
FIG. 1: shows a schematic sectional illustration of a vacuum interrupter from the prior art.

FIG. 1 shows a schematic sectional illustration of a vacuum interrupter 2 from the prior art. The vacuum interrupter 2 has an insulator 10, on which a movable contact 40 is arranged via a bellows 25 and a movable-contact connection 20. The fixed contact 50 is arranged on the other side of the insulator 10 via a fixed-contact connection 30. The movable contact consists of a movable-contact rod 410 and a movable-contact contact element 420. The fixed contact consists of a fixed-contact rod 510 and a fixed-contact contact element 520.

Figure 2:
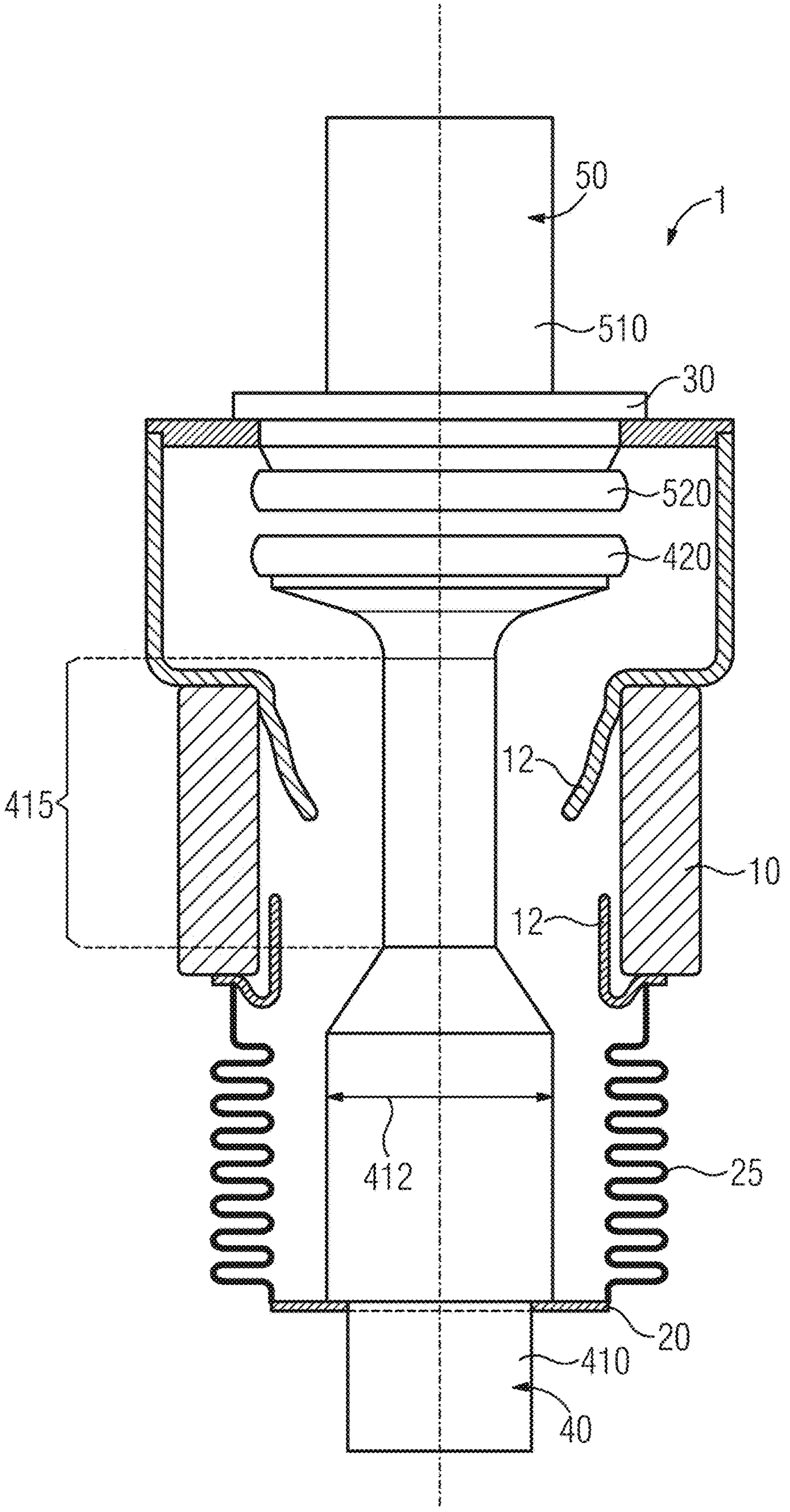
FIG. 2: shows a schematic sectional illustration of a vacuum interrupter according to the invention.
Figure 3:
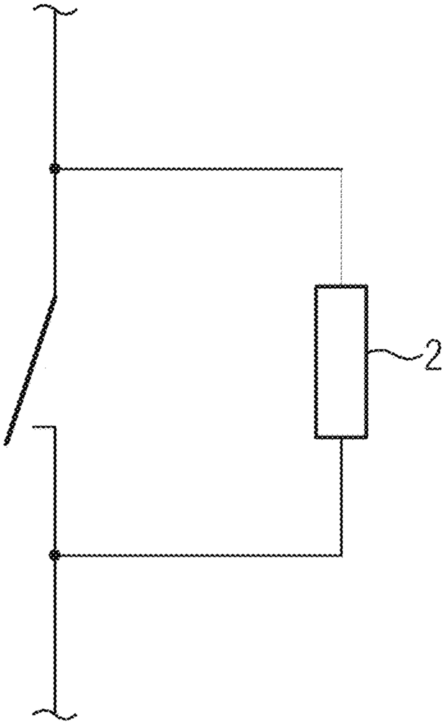
FIG. 3: shows a schematic view of a compact vacuum interrupter arranged in a secondary current path.
Figure 4:
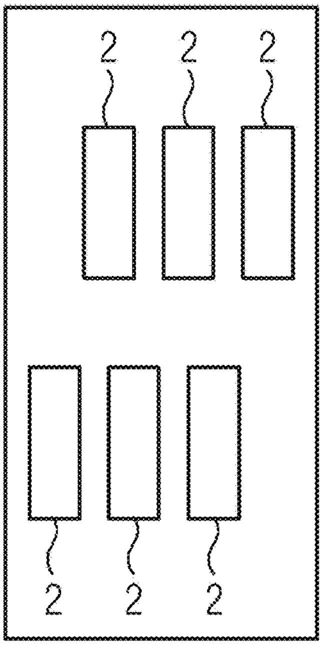
FIG. 4: shows a schematic view of compact vacuum interrupters arranged in a tap charger.

FIG. 2 shows a schematic sectional illustration of a compact vacuum interrupter 1 according to the invention. The compact vacuum interrupter 1 has an insulator 10, on which a movable contact 40 is arranged via a bellows 25 and a movable-contact connection 20. The fixed contact 50 is arranged on the other side of the insulator 10 via a fixed-contact connection 30. The movable contact consists of a movable-contact rod 410 and a movable-contact contact element 420. The fixed contact consists of a fixed-contact rod 510 and a fixed-contact contact element 520. In the preferred embodiment shown here, the movable-contact rod 410 consists of a first material which is mechanically stronger than the second material of the fixed contact 50.

In the embodiment shown here, a respective metal connecting piece, which can vary in terms of shape and length, is arranged between the insulator 10 and the fixed-contact connection 30 and between the insulator 10 and the movable-contact connection 20.

Furthermore, the preferred embodiment shown here additionally has a narrowing of the movable-contact rod 410 in a first movable-contact rod region 415, in which the diameter 412 of the preferably cylindrical movable-contact rod 410 is reduced, in particular by 5% to 25%, particularly preferably 10% to 20%.

This narrowing makes it possible to reduce the diameter of the insulator 10 further, in particular to reduce it further than selecting the first material as mechanically stronger than the second material alone would. Furthermore, in spite of the reduced diameter of the insulator, it is possible to arrange shields 412 between the insulator 10 and the movable-contact rod 410.

LIST OF REFERENCE SIGNS

1 Compact vacuum interrupter;
2 Vacuum interrupter;
10 Insulator;
12 Shield elements;
20 Movable-contact connection;
25 Bellows of the movable-contact connection 20;
30 Fixed-contact connection;
40 Movable contact;
50 Fixed contact;
410 Movable-contact rod;
412 Diameter of the movable-contact rod 410;
415 First movable-contact rod region;
420 Movable-contact contact element;
510 Fixed-contact rod;
520 Fixed-contact contact element.

The invention claimed is:

1. A compact vacuum interrupter, comprising:

an insulator element, a movable-contact connection, a movable contact, a fixed-contact connection, and a fixed contact;

said movable contact having a movable-contact rod and a movable-contact contact element;

said fixed contact having a fixed-contact rod and a fixed-contact contact element;

said movable contact being formed with a first material and said fixed contact being formed with a second material, wherein said first material is mechanically stronger than said second material;

said movable-contact rod having a given diameter and being formed with a narrowing, in a first movable-contact rod region, with said narrowing having a reduced diameter reducing the given diameter of said movable-contact rod by 5% to 25%.

2. The compact vacuum interrupter according to claim 1, wherein:

said movable-contact rod is made with said first material and said fixed-contact rod is made with said second material;

said movable-contact contact element and said fixed-contact contact element are made from a third material; and said first material is mechanically stronger than said second material and said third material is a material that is optimized in terms of properties under arc conditions.

3. The compact vacuum interrupter according to claim 2, wherein said first material is a chromium-nickel alloy or a steel alloy, said second material is copper or a copper alloy, and said third material is copper or a copper alloy.

4. The compact vacuum interrupter according to claim 2, wherein said third material is copper or a copper alloy.

5. The compact vacuum interrupter according to claim 4, wherein said third material is a copper alloy made with at least one material selected from the group consisting of tungsten, chromium, and carbon.

6. The compact vacuum interrupter according to claim 1, wherein said second material is copper or a copper alloy.

7. The compact vacuum interrupter according to claim 1, wherein said first material is a chromium-nickel alloy or a steel alloy.

8. The compact vacuum interrupter according to claim 7, wherein said first material is a stainless steel alloy.

9. The compact vacuum interrupter according to claim 1, wherein said narrowing reduces the given diameter of said movable-contact rod by 10% to 20%.

10. The compact vacuum interrupter according to claim 1, wherein said first movable-contact rod region with said narrowing is arranged in the compact vacuum interrupter to locate said first movable-contact rod region within said insulator element.

11. The compact vacuum interrupter according to claim 1, which comprises two or more shield elements arranged between said insulator element and said first movable-contact rod region.

12. A switchgear, comprising a compact vacuum interrupter having:

an insulator element, a movable-contact connection, a movable contact, a fixed-contact connection, and a fixed contact;

said movable contact having a movable-contact rod and a movable-contact contact element;

said fixed contact having a fixed-contact rod and a fixed-contact contact element;

said movable contact being formed of a first material and said fixed contact being formed of a second material, wherein said first material is mechanically stronger than said second material; and said movable-contact rod having a given diameter and said movable-contact rod being formed with a narrowing, in a first movable-contact rod region, with a reduced diameter, and wherein said narrowing reduces the given diameter of said movable-contact rod by 5% to 25%.

13. The switchgear according to claim 12, wherein said compact vacuum interrupter is arranged in a secondary current path and is configured to switch off rated currents.

14. The switchgear according to claim 12, wherein one or more of said compact vacuum interrupters are arranged in a tap changer.

* * * * *